Figure 1:
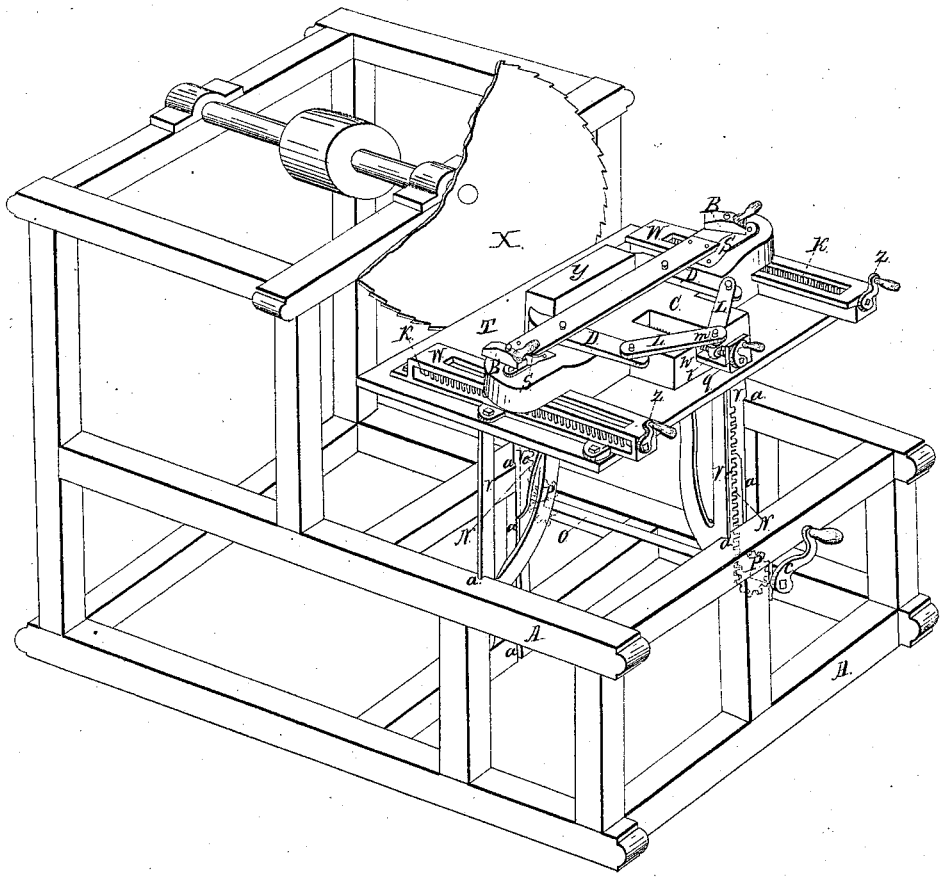
Figure 2:
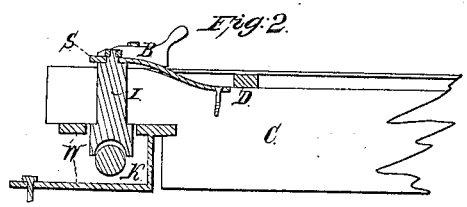

J. L. Beadle,
Sawing Shingles,
N°. 19,906. Patented Apr. 13, 1858.

UNITED STATES PATENT OFFICE.

JNO. L. BEADLE, OF MARENGO, NEW YORK.

SAWING-MACHINE.

Specification of Letters Patent No. 19,906, dated April 13, 1858.

*To all whom it may concern:*

Be it known that I, JOHN L. BEADLE, of Marengo, Wayne county, and State of New York, have invented a new and useful Improvement in Shingle-Sawing Machines; and I do hereby declare that the following is a full, clear, and exact description and operation of the same, reference being had to the annexed drawing, making a part of this specification, in which—

Figure I is a perspective view, Fig. II is a lengthwise vertical section of the cross-head and a transverse section of one of the ways upon which the cross-head runs, showing the step-nut and screw by which the cross-head is moved to and from the saw and set to any position required.

My invention consists in arranging upon a strong and substantial framework, a three foot circular saw, and a table which can be raised, in the act of sawing, and lowered at will, and upon the table, a cross-head, so arranged upon ways that, by means of a screw at each end of the cross-head it can be moved to or from the saw or held to its position when set, or to alternate the moving of one end of the cross-head forward of the other in order to obtain the taper of the shingle required and cut the butt of the shingle from opposite ends of the block alternately.

The block or bolt to be sawed is held to its position upon the table by means of clamps or dogs working in the cross-head and these open or shut, upon the block or bolt, by means of Y levers which are operated by a crank and screw in a similar manner to that of moving the cross-head. It being the object by this arrangement, to obtain the practicable facility of not only cutting shingles lengthwise and with the grain of the wood but the shingles with the taper on one side only. As also, to adapt the same arrangement, for cutting heading or short staves.

Fig. I is a perspective view in which A is a frame, and that part $A^1$ which supports the saw X, is raised above A, which supports the table T, thirty-two inches, or sufficiently high to carry X, (which is three feet in diameter) far enough above T, to admit of passing the block or bolt Y, under it when T is at its lowest position.

The table T, (Fig. I,) is raised up to about its highest ordinary working position, in order to show the sliding standards V, which run in grooves $a$, and upon which T rests, as also the pinions P upon their shaft O, as they work in the racks N, which are fastened to opposite standards $V^e$, so that by turning the crank $c$, which is attached to O, the table T is raised, and thereby the bolt Y, is easily graduated to the motion of the saw X. The cross-head C, rests upon box ways W, lengthwise through which run screws K. W is firmly bolted to T, and slotted at the top to admit the step-nut I, (as seen in Fig. II,) to pass up through C and fasten to the spring S, so that by turning the buttons B, around upon S, the step-nut I is set down upon K in readiness for operating the crosshead C. The block or bolt, to be sawed, is held to its position by means of the dogs D, and these are opened and shut by means of Y levers L, and the joint at $m$, (being their sliding axis of motion) the pin, of which, forms at the lower end the nut $t$, and through which the screw $h$, passes, having a crank $q$, which when turned opens or shuts D, quickly and when shut upon Y, holds with great power.

The operation will be as follows: The table T is lowered to its proper position in readiness to receive the bolt Y, by turning the crank $z$, which is attached to the shaft O;—then by turning the crank $q$, D is opened to receive Y, and which when closed upon Y, by a reverse motion of $q$, is held firmly to its position upon the table T. The saw X is next set in motion. C is then moved forward by turning the crank $z$, (which is attached to K) an equal number of times, or until Y is brought in a favorable position, under X, to be faced preparatory to cutting a shingle, and which is done by using both hands to $z$, at the same time,—then by turning $c$ gradually Y is raised and faced, and with the grain of the wood, if care has been taken in dogging, as should be in every instance. Then lower T, to its proper position, for the second operation,—then by turning the crank $z$, which is on the right hand two revolutions (the lead of K being the fourth of an inch) and $z$, on the left hand but one revolution. T is again, (in like manner as before,) ready to be raised and a shingle cut from Y, with the taper on one side only. Then by alternating and turning $z$, on the left hand two revolutions, and $z$, on the right but one revolution the butt of the shingle is cut from the opposite end of Y, with like results as before,—and so on alternating the position of Y to X, until it is sawed up. Then by turning B and letting $s$, rise up, I is raised from K far enough to admit of pulling C back with the hands and of receiving Y to be sawed up as before.

What I claim as new and desire to secure by Letters Patent is—

The combination embraced in the manner of raising the table with the manner of adjusting the cross-head and dogs, as herein described and for the purposes set forth.

JOHN L. BEADLE.

Witnesses:
M. D. BEADLE,
O. C. EVANS.